United States Patent [19]
Adams

[11] 4,093,394
[45] June 6, 1978

[54] DOWEL HOLE-BORING JIG

[76] Inventor: Arthur Adams, c/o Karl Davenport, 9614 Heatherdale Dr., Dallas, Tex. 75243

[21] Appl. No.: 812,573

[22] Filed: Jul. 5, 1977

[51] Int. Cl.² .............................................. B23B 49/00
[52] U.S. Cl. .................................. 408/103; 408/72 B; 408/115 R; 33/185 R
[58] Field of Search ............. 408/103, 108, 107, 72 R, 408/72 B, 97, 115, 241 B, 109; 33/185 R; 144/92, 93 R, 104

[56] References Cited
U.S. PATENT DOCUMENTS

| 2,260,784 | 10/1941 | Morton | 408/103 |
| 2,934,979 | 5/1960 | Hartje | 408/103 |
| 3,708,237 | 1/1973 | Kruse | 408/108 |

*Primary Examiner*—Gil Weidenfeld
*Attorney, Agent, or Firm*—James A. Eyster

[57] ABSTRACT

A boring jig is provided having at least one drill bit guidance hole and having two clamps for holding the work. Provision is made for passing the drill bit through the guidance hole in one direction to drill a first work piece held under one clamp, then consecutively to pass the drill through the same guidance hole in the opposite direction to drill a mirror-image hole in a second work piece held under the other clamp.

8 Claims, 4 Drawing Figures

DOWEL HOLE-BORING JIG

BACKGROUND OF THE INVENTION

This invention relates to cabinetry and particularly to the art of joining two pieces of wood, such as two boards, by means of dowels.

In doweling two pieces of wood together, matching holes are bored in the two pieces and a dowel, usually of wood, is pressed into the hole in one piece, then fitted into the hole in the other piece, using glue to secure the dowel. In boring the hole in one of the pieces a drill jig can be used so that the hole is bored truly perpendicular to the plane of the edge. The match location for a hole in the other piece is then found by measuring the position of the first-bored hole and transferring the measurement to the second piece to be bored. A drill jig can then be used to bore the hole.

The procedure is more involved when, for example, in assembling the rails and styles of a door, and pair of dowels are used at each corner of the door. These two dowel holes near the end of a style of the door must be drilled exactly perpendicular to the edge of the piece, and their distance apart and from the end of the piece must then be measured exactly. Then the mirror-image measurements must be transformed to the rail to be joined by dowel pins. If a drill jig is used to drill the style or first piece it cannot be used to drill the rail without preliminary manual measurements because the hole measurements are not duplicates but mirror images of the first piece or style measurements.

Thus presently available portable drill jigs are useful in drilling the first piece but cannot be used without manual measuring to drill the second piece. All of the holes in the second piece must be marked for drilling by careful measurement of the first piece, after drilling, and the measurements must be carefully transferred manually, as mirror-image measurements, to the second piece. This measurement and marking must be meticulously accurate, and may be beyond the skill of all but the best cabinet makers.

SUMMARY OF THE INVENTION

The jig of this invention is symmetrical and has two identical work-holding clamps. One clamp is used for holding a first piece of work, such as a style of a door, which is drilled, and then the other clamp is used for holding a second piece of work, such as a rail of a door, in which mirror-image holes are to be bored. This eliminates all manual measuring and the accuracy, both angular and positional, is as good as the accuracy of manufacture of the jig, which can be very good indeed. Thus the excellence of the joining fit can always be perfect.

The jig provides two guide holes for a bit to permit drilling two dowel holes near each other. However, the jig can be used to drill a single dowel hole while retaining the novel features of the invention.

The object of this invention is to provide a doweling jig which automatically provides a perfect doweling fit, and obviates the necessity of any manual measuring for the dowel holes in the second or mirror-image piece.

DESCRIPTION OF THE PREFERRED EMBODIMENTS

Figure 1:
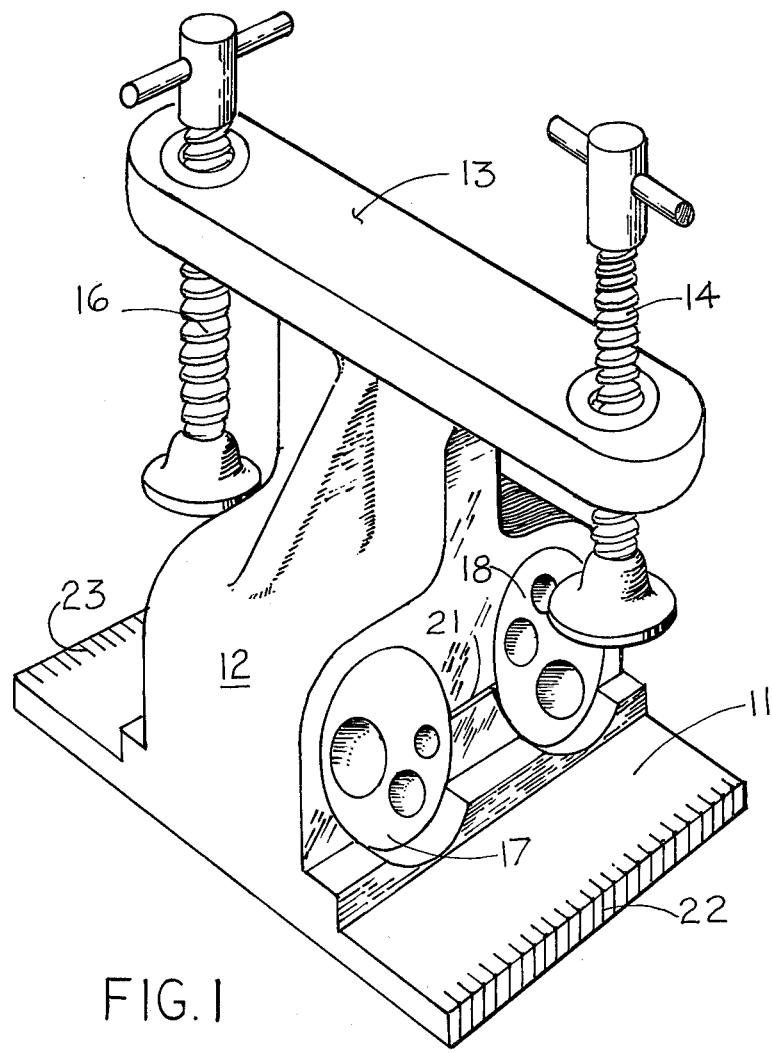
FIG. 1 is a perspective view of the dowel hole boring jig.

Referring now to FIG. 1, a base 11, preferably steel, is secured to a frame 12. Frame 12 carries a horizontal clamp bar 13 having two screw clamps, 14 and 16, verticaly set in its ends. The frame 12 is bored to receive two cylinders, 17 and 18, which can be freely rotated in the frame or locked in place by a clamp screw 18, FIG. 2, passed vertically up through base 11 and threaded into frame 12 between the cylinders. The frame 12 is split between the cylinders, one end of the split being visible at 21, so that tightening of screw 19 draws the frame down to clamp both cylinders.

The cylinders 17 and 18 are bored through longitudinally with several holes of the sizes of dowels commonly used.

Figure 2:
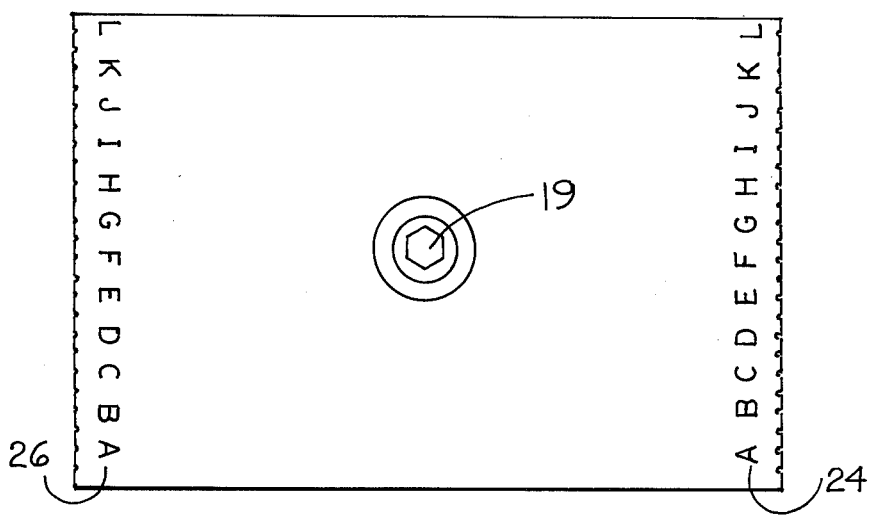
FIG. 2 is a plan bottom view of the jig.

The base 11 is scored with scratches 22 on one end and top, and with scratches 23 on the other end and top which are positionally the mirror images of scratches 22. Both sets of scratches are numbered or lettered as shown in FIG. 2 at 24 and 26.

Figure 3:
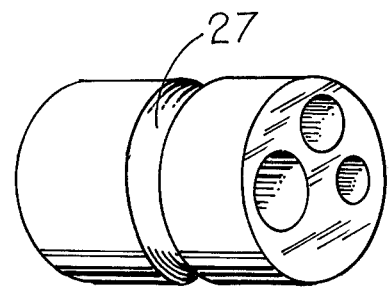
FIG. 3 is a perspective view of one of the cylinders.
Figure 4:
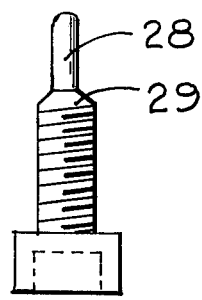
FIG. 4 is a view of a clamping screw.

In FIGS. 3 and 4 an alternative method of locking the cylinders in place is shown. Each cylinder is provided with a circumferential groove 27. In place of the clamping screw 19, FIG. 2, which was threaded into the frame 12 above the split 21, a screw having a straight pin end 28, FIG. 4, and a tapered shoulder 29, may be employed threaded into the part of frame 12 below the line of nearest approach of the two cylinders. The cylinders are positioned closely together, leaving only that amount of frame required for drilling and tapping between the cylinders for the screw, FIG. 4. The split 21 is omitted.

In using the screw, FIG. 4, when it is inserted far enough for the straight end pin 28 to engage the slots 27 in both cylinders, the cylinders are captured and cannot be removed, but both can be rotated freely. When the screw is screwed in further the shoulder 29 engages both cylinders, locking them both to prevent rotation.

In operation of the dowel hole boring jig to bore two holes, select the size dowel holes desired and, with the cylinders unlocked, rotate the cylinders to bring the selected dowel holes to the preferred positions. Lock the cylinders. Clamp the first work piece under one of the clamps, for example clamp 14. Note the position of the work piece relative to the base scale 22. Next, insert the bit from the opposite end into a selected hole in one cylinder and, guided by the hole, bore the first work piece. Do the same through the selected hole in the other cylinder.

Now remove the first work piece and clamp the second work piece under the other clamp 6, with a reference mark on this work piece positioned on scale 23 in mirror image of the position of the first work piece. Now insert the bit through the selected hole in one cylinder from the end adjacent to scale 22, so as to bore a mirror-image hole in the second work piece. Repeat the operation using the other cylinder.

What is claimed is:
1. A dowel hole boring jig comprising:
   at least one right circular cylinder longitudinally pierced by at least one round cross-section hole having a selected diameter equal to a dowel hole bit diameter, said hole extending from a first end of the cylinder to the other end thereof;
   a portable base;

a frame secured to said base and provided with at least one circular cross section aperture shaped, sized and positioned to hold said cylinder in a horizontal position above and parallel to the base;

first clamp means secured in said frame above and beyond said cylinder's first end whereby a first work piece can be clamped adjacent to the cylinder's first end in positon to be bored by a bit passed through said hole from said other end thereof; and second clamp means secured in said frame above and beyond said cylinder's other end whereby a second work piece can be clamped adjacent to the cylinder's other end in position to be bored by a bit passed through said hole from said first end thereof.

2. A dowel hole boring jig in accordance with claim 1 having means for alternatively locking and releasing said cylinder whereby it can be rotated in said frame or locked immobile relative to the frame.

3. A dowel hole boring jig in accordance with claim 2 in which said locking means comprises a screw vertically threaded upward through said base into said frame adjacent to said cylinder whereby the frame is drawn and shrunk constrictively around the cylinder to immobilize it.

4. A dowel hole boring jig in accordance with claim 2 in which said locking means comprises:

a cylinder in accordance with claim 1 but additionally is provided with a circumferential semicircular cross section groove; and a screw having an end in the form of a straight, unthreaded pin, has a threaded shank and has a tapered shoulder joining said pin to said threaded shank, the screw being positioned vertically adjacent to said groove and threaded upward through said base and frame, whereby partial insertion of the screw causes the pin thereof to enter said groove and capture said cylinder, and whereby full insertion of the screw causes the tapered shoulder thereof to press against the groove and lock the cylinder against any movement.

5. A dowel hole boring jig in accordance with claim 1 in which said base is provided with first indicia adjacent to said first cylinder end and is provided with additional indicia adjacent to said cylinder's other end, said additional indicia being positionally the mirror image of said first indicia.

6. A dowel hole boring jig in accordance with claim 1 comprising:

a horizontal bar member of said frame above said cylinder, the member having threaded holes in its two ends above and beyond said cylinder's first end and above and beyond said cylinder's other end respectively;

a first screw clamp having a vertical threaded shaft positioned in the said frame threaded hole above and beyond the cylinder's first end; and a second screw clamp having a vertical threaded shaft positioned in the said frame threaded above and beyond the cylinder's other end.

7. A dowel hole boring jig in accordance with claim 1 having two similar said cylinders positioned side by side with axes horizontal and parallel.

8. A dowel hole boring jig in accordance with claim 1 in which the hole in said cylinder is parallel to the axis of the cylinder.

* * * * *